United States Patent
Wang et al.

(10) Patent No.: US 12,156,249 B2
(45) Date of Patent: Nov. 26, 2024

(54) METHOD AND APPARATUS FOR CHANNEL OCCUPANCY MEASUREMENT

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 17/762,132

(22) PCT Filed: Sep. 23, 2020

(86) PCT No.: PCT/EP2020/076619
§ 371 (c)(1),
(2) Date: Mar. 21, 2022

(87) PCT Pub. No.: WO2021/058598
PCT Pub. Date: Apr. 1, 2021

(65) Prior Publication Data
US 2023/0337278 A1    Oct. 19, 2023

(30) Foreign Application Priority Data
Sep. 26, 2019   (WO) ................ PCT/CN2019/108239

(51) Int. Cl.
*H04W 4/00*    (2018.01)
*H04W 24/10*   (2009.01)
*H04W 74/0808* (2024.01)

(52) U.S. Cl.
CPC ....... *H04W 74/0808* (2013.01); *H04W 24/10* (2013.01)

(58) Field of Classification Search
CPC ............ H04W 74/0808; H04W 24/10; H04W 72/542; H04W 52/0277; H04W 52/0238;
(Continued)

(56) References Cited

U.S. PATENT DOCUMENTS

2012/0094608 A1    4/2012  Shi et al.
2018/0049047 A1    2/2018  Lin et al.
(Continued)

FOREIGN PATENT DOCUMENTS

EP    3496502 A1    6/2019
WO    2019029597 A1  2/2019
WO    2019098156 A1  5/2019

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.5.1, Apr. 2019, 1-491.
(Continued)

*Primary Examiner* — Chuong T Ho
(74) *Attorney, Agent, or Firm* — Murphy, Bilak & Homiller, PLLC

(57) ABSTRACT

Various embodiments of the present disclosure provide a method for channel occupancy measurement. The method comprises determining at least one channel measurement configuration for a terminal device. The method further comprises transmitting the at least one channel measurement configuration to the terminal device. The channel measurement configuration comprises configuring the terminal device to measure a channel occupancy of at least one channel. Various embodiments of the present disclosure also provide an apparatus for channel occupancy measurement.

19 Claims, 11 Drawing Sheets

(58) Field of Classification Search
CPC ....... Y02D 30/70; H04L 5/005; H04L 5/0048; H04L 5/0062; H04L 5/0094; H04L 5/0007; H04L 27/0006; H04L 5/0053; H04L 5/0078; H04L 5/0091; H04L 5/001
USPC ........................................ 370/329, 330, 328
See application file for complete search history.

(56) References Cited

U.S. PATENT DOCUMENTS

| | | | |
|---|---|---|---|
| 2019/0052379 A1 | 2/2019 | Lin et al. | |
| 2019/0215834 A1 | 7/2019 | Novlan et al. | |
| 2019/0230574 A1 | 7/2019 | Novlan et al. | |
| 2020/0052803 A1* | 2/2020 | Deenoo | H04B 17/327 |
| 2021/0212121 A1* | 7/2021 | Niu | H04W 48/20 |
| 2021/0297170 A1* | 9/2021 | Niu | H04B 7/088 |
| 2022/0007239 A1* | 1/2022 | Roy | H04W 36/0094 |
| 2022/0095176 A1* | 3/2022 | Lim | H04W 36/0058 |
| 2022/0287085 A1* | 9/2022 | Murayama | H04W 74/0808 |
| 2022/0330107 A1* | 10/2022 | Chang | H04W 36/36 |
| 2023/0217525 A1* | 7/2023 | Kim | H04W 76/20 370/329 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, 1-519.

Ericsson, "Conditional Handover in NR", 3GPP TSG RAN WG2 #105, R2-1900404, Athens, Greece, Feb. 25-Mar. 1, 2019, 1-6.

Mediatek Inc., "Idle/Inactive Mode Measurements in NR-U", 3GPP TSG-RAN2#105 meeting, R2-1900245, Athens, Feb. 25-Mar. 1, 2019, 1-3.

Ng, Boon Loong, et al., "Unified access in licensed and unlicensed bands in LTE-A Pro and 5G", SIP (2017), vol. 6, Industrial Technology Advances, Jun. 5, 2017, 1-7.

* cited by examiner

METHOD AND APPARATUS FOR CHANNEL OCCUPANCY MEASUREMENT

FIELD OF THE INVENTION

The present disclosure generally relates to communication networks, and more specifically, to channel occupancy measurement in a wideband carrier containing multiple channels.

BACKGROUND

This section introduces aspects that may facilitate a better understanding of the disclosure. Accordingly, the statements of this section are to be read in this light and are not to be understood as admissions about what is in the prior art or what is not in the prior art.

The 5th generation of cellular system, called New Radio (NR) is developed for maximum flexibility to support multiple and substantially different use cases. Besides the typical mobile broadband use case, also machine type communication (MTC), ultra-low latency critical communications (URLCC), side-link device-to-device (D2D) and several other use cases too.

In NR, the basic scheduling unit is called a slot. A slot consists of 14 OFDM symbols for the normal cyclic prefix configuration. NR supports many different subcarrier spacing configurations and at a subcarrier spacing of 30 kHz the OFDM symbol duration is ~33 us. As an example, a slot with 14 symbols for the same subcarrier-spacing (SCS) is 500 us long (including cyclic prefixes).

NR also supports flexible bandwidth configurations for different UEs on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous PRBs. Reserved resources can be configured within the bandwidth part. The bandwidth of a bandwidth part equals to or is smaller than the maximal bandwidth capability supported by a UE.

NR is targeting both licensed and unlicensed bands. Allowing unlicensed networks, i.e., networks that operate in shared spectrum (or unlicensed spectrum) to effectively use the available spectrum is an attractive approach to increase system capacity. A subcarrier spacing of 15 or 30 kHz are the most promising candidates for NR-unlicensed (NR-U) OFDM numerologies for frequencies below 6 GHz.

When operating in unlicensed spectrum many regions in the world require a device to sense the medium as free before transmitting, This operation is often referred to as listen before talk or LBT for short. There are many different flavors of LBT, depending on which radio technology the device uses and which type of data it wants to transmit at the moment. Common for all flavors is that the sensing is done in a particular channel (corresponding to a defined carrier frequency) and over a predefined bandwidth. For example, in the 5 GHz band, the sensing is done over 20 MHz channels.

Many devices are capable of transmitting (and receiving) over a wide bandwidth including of multiple sub-bands/channels, e.g., LBT sub-band (i.e. the frequency part with bandwidth equals to LBT bandwidth). A device is only allowed to transmit on the sub-bands where the medium is sensed as free. Again, there are different flavors of how the sensing should be done when multiple sub-bands are involved.

In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as single channel with a larger bandwidth. The other way is that the device operates almost independent processing chains for each channel Depending on how independent the processing chains are, this option can be referred to as either carrier aggregation (CA) or dual connectivity (DC).

Listen-before-talk (LBT) is designed for unlicensed spectrum co-existence with other Radio Access Technologies (RATs). In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before next CCA attempt. In order to protect the acknowledgment (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For Quality of Service (QoS) differentiation, a channel access priority based on the service type has been defined. For example, there are four LBT priority classes are defined for differentiation of contention window sizes (CWS) and MCOT between services.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In licensed spectrum, user equipment (UE) measures Reference Signal Received Power (RSRP), and Reference Signal Received Quality (RSRQ) of the downlink radio channel, and provides the measurement reports to its serving base station, such as Evolved Node B (eNB) or (next) generation Node B (gNB). However, they don't reflect the interference strength on the carrier. Another metric Received Signal Strength Indicator (RSSI) can serve for such purpose. At the eNB/gNB side, it is possible to derive RSSI based on the received RSRP and RSRQ reports, however, this requires that they must be available. Due to the LBT failure, some reports in terms of RSRP or RSRP may be blocked (can be either due to that the reference signal transmission (DRS) is blocked in the downlink or the measurement report is blocked in the uplink). Hence, the measurements in terms of RSSI are very useful. The RSSI measurements together with the time information concerning when and how long time that UEs have made the measurements can assist the gNB/eNB to detect the hidden node. Additionally, the gNB/eNB can measure the load situation of the carrier which is useful for the network to prioritize some channels for load balance and channel access failure avoidance purposes.

As described above, the measurements are configured to measure the RSRP/RSRQ/SINR for mobility measurement, wherein the RSRP/RSRQ/SINR is measured either based on the CSI-RS or SSB. For licensed operation, the measurement report indicating RSRP/RSRQ/SINR is fine. However, for unlicensed operation, a carrier may comprise one or multiple bandwidth parts (BWPs), one wideband BWP may be configured with multiple LBT channels/subbands, wherein each channel/subband has a fixed channel bandwidth (e.g., 20 MHz in unlicensed 5 GHz bands). In addition to the radio quality such as SSB-RSRP/RSRQ/SINR (or CSI-RSRP/RSRQ/SINR), a UE may be also configured to measure channel occupancy (CO) for a cell or carrier.

The channel occupancy (CO) is defined as percentage of time that Received Signal Strength Indicator (RSSI) was measured above a configured threshold. For this purpose, a RSSI measurement timing configuration (RMTC) includes a measurement duration (e.g. 1-5 ms) and a period between measurements (e.g. {40, 80, 160, 320, 640} ms).

The measurement configuration should be enhanced in order to support LBT channel specific measurements. In this case, the UE may be able to provide CO measurements with finer granularity per LBT channel. A better handover (HO) or RRM decision upon received CO measurement results may be made for a UE by the gNB especially in case the channels are unequally loaded in the serving cell.

The present disclosure proposes a solution of channel occupancy measurement in a wideband carrier containing multiple channels. In the below aspects, the terms "channel", "LBT channel" and "LBT subband" are equally applicable.

According to a first aspect of the present disclosure, there is provided a method implemented at a network node. The method comprises determining at least one channel measurement configuration for a terminal device. The method further comprises transmitting the at least one channel measurement configuration to the terminal device. The channel measurement configuration comprises configuring the terminal device to measure a channel occupancy (CO) of at least one channel.

In accordance with an exemplary embodiment, the channel is a bandwidth segment of a neighboring cell of the terminal device, or the channel is a bandwidth segment of a carrier.

In accordance with an exemplary embodiment, the channel measurement configuration is transmitted via Radio Resource Control (RRC) signaling.

In accordance with an exemplary embodiment, the channel measurement configuration comprises at least one of: measurement object, reporting configuration, measurement identity, quantity configuration, and measurement gap.

In accordance with an exemplary embodiment, the measurement object comprises at least one of: frequency or time location, subcarrier spacing of reference signal to be measured, and single carrier frequency.

In accordance with an exemplary embodiment, the frequency or time location comprises channel frequency and/or channel frequency offset.

In accordance with an exemplary embodiment, the at least one channel measurement configuration is associated with a list of channels of a carrier or a cell, the at least one channel measurement configuration comprises multiple measurement objects, and each of measurement object is associated with an channel.

In accordance with an exemplary embodiment, the channel measurement configuration comprises at least one of: a channel measurement mode and a full bandwidth measurement mode.

In accordance with an exemplary embodiment, the method according to the first aspect of the present disclosure may further comprise transmitting a signal indicating the terminal device to switch between the channel measurement mode and the full bandwidth measurement mode.

In accordance with an exemplary embodiment, the method according to the first aspect of the present disclosure may further comprise receiving at least one channel measurement report for the CO measurement result of the at least one channel.

In accordance with an exemplary embodiment, the channel measurement report comprises CO measurement result of one channel, average CO measurement result of all configured channels of a cell or carrier, and/or respective CO measurement result of all configured channels of a cell or carrier.

In accordance with an exemplary embodiment, the method according to the first aspect of the present disclosure may further comprise determining a trigger criteria for a handover or update Radio Resource Management (RRM) configuration for the terminal device based on the received at least one channel measurement report.

In accordance with an exemplary embodiment, the handover comprises conditional handover (CHO) and the trigger criteria for the handover comprises at least one of: Reference Signal Receiving Power, RSRP, Reference Signal Receiving Quality, RSRQ, Signal to Interference plus Noise Ratio, SINR, and CO measurement result.

In accordance with an exemplary embodiment, the channel measurement report is received in one of the following ways: a periodical way, an event triggered way, and a configured triggering condition way.

According to a second aspect of the present disclosure, there is provided an apparatus implemented in a network node. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus implemented in a network node. The apparatus comprises a determining module and a transmitting module. In accordance with some exemplary embodiments, the determining module is operable to carry out at least the determining step of the method according to the first aspect of the present disclosure. The transmitting module is operable to carry out at least the transmitting step of the method according to the first aspect of the present disclosure.

According to a fifth aspect of the present disclosure, there is provided a method implemented at a terminal device. The method comprises receiving at least one channel measurement configuration from a network node. The channel measurement configuration comprises configuring the terminal device to measure a channel occupancy (CO) of at least one channel. The method further comprises performing CO measurement for the channel according to the channel measurement configuration.

In accordance with an exemplary embodiment, the method according to the fifth aspect of the present disclosure may further comprise obtaining at least one channel measurement result.

In accordance with an exemplary embodiment, the method according to the fifth aspect of the present disclosure may further comprise determining whether to trigger a channel measurement report.

In accordance with an exemplary embodiment, the method according to the fifth aspect of the present disclosure may further comprise transmitting at least one channel measurement report for the CO measurement result of the at least one channel.

In accordance with an exemplary embodiment, the channel is a bandwidth segment of a neighboring cell of the terminal device, or the channel is a bandwidth segment of a carrier.

In accordance with an exemplary embodiment, the channel measurement configuration is received via Radio Resource Control (RRC) signaling.

In accordance with an exemplary embodiment, the channel measurement configuration comprises at least one of: measurement object, reporting configuration, measurement identity, quantity configuration, and measurement gap.

In accordance with an exemplary embodiment, the measurement object comprises at least one of: frequency or time location, subcarrier spacing of reference signal to be measured, and single carrier frequency.

In accordance with an exemplary embodiment, the frequency or time location comprises channel frequency and/or channel frequency offset.

In accordance with an exemplary embodiment, the at least one channel measurement configuration is associated with a list of channels of a carrier or a cell, the at least one channel measurement configuration comprises multiple measurement objects, and each of measurement object is associated with an channel.

In accordance with an exemplary embodiment, the performing further comprises performing CO measurement for all configured channels when the terminal device received an channel list, or performing CO measurement for channels where the Synchronization Signal Block (SSB) is located.

In accordance with an exemplary embodiment, the channel measurement report comprises CO measurement result of one channel, average CO measurement result of all configured channels of a cell or carrier, and/or respective CO measurement result of all configured channels of a cell or carrier.

In accordance with an exemplary embodiment, the channel measurement report is received in one of the following ways: a periodical way, an event triggered way, and a configured triggering condition way.

In accordance with an exemplary embodiment, the channel measurement configuration comprises at least one of: a channel measurement mode and a full bandwidth measurement mode.

In accordance with an exemplary embodiment, the method according to the fifth aspect of the present disclosure may further comprise receiving a signal indicating the terminal device to switch between the channel measurement mode and the full bandwidth measurement mode.

In accordance with an exemplary embodiment, the method according to the fifth aspect of the present disclosure may further comprise switching between the channel measurement mode and the full bandwidth measurement mode based on at least one of: a service or traffic type of the terminal device, mobility status of the terminal device, and capability and/or battery life of the terminal device.

According to a sixth aspect of the present disclosure, there is provided an apparatus implemented in a terminal device. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus implemented in a terminal device. The apparatus comprises a receiving module and a performing module. In accordance with some exemplary embodiments, the receiving module is operable to carry out at least the receiving step of the method according to the fifth aspect of the present disclosure. The performing module is operable to carry out at least the performing step of the method according to the fifth aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

With above aspects of the present disclosure, the terminal device (e.g. UE) may be configured to measure channel occupancy (CO) for a channel, so that the UE is able to provide CO measurements with finer granularity per channel. In addition, a better handover (HO) or RRM decision upon received CO measurement results may be made for the UE by the gNB especially in case the channels are unequally loaded in the serving cell. In other words, for a wideband BWP/carrier comprising multiple channels, channel specific CO measurement configuration and report may be supported so that the gNB can improve its decision for triggering a HO or updating RRM parameters. Besides, a good balance between better QoS guarantee and improving power saving of a UE may be achieved.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
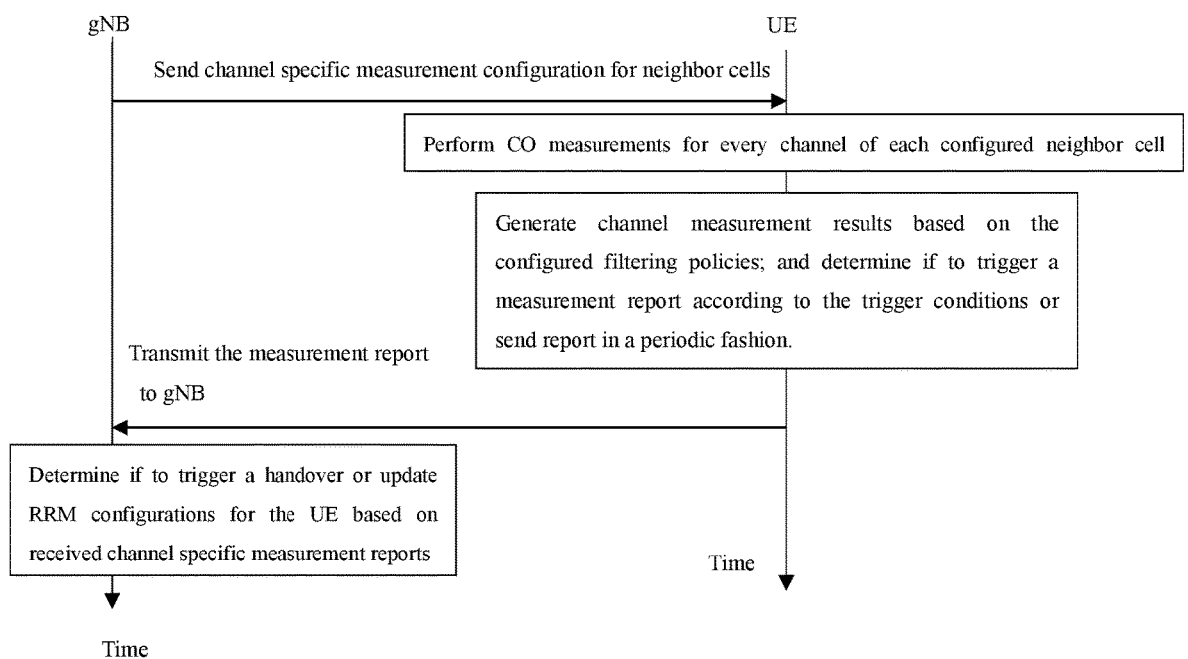
FIG. 1 is a flowchart illustrating an exemplary signaling according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G, 6G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaining terminal devices, music storage and playback appliances, a mobile phone, a cellular phone, a smart phone, a tablet, a wearable device, a personal digital assistant (PDA), a vehicle, and the like. In the following description, terms "terminal device" and "UE" will be used interchangeably.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The below embodiments are described in the context of NR unlicensed spectrum (NR-U). Our solutions are not limited to NR-U scenarios. They are also applicable to other unlicensed operation scenarios such as LTE License Assisted Access (LAA)/Enhanced licensed assisted access (eLAA)/Further Enhanced LAA (feLAA)/Multifare. In the below embodiments, the terms "channel" or "LBT channel" is used to represent each independent LBT bandwidth segment in an unlicensed carrier. Other similar terms such as "LBT subband" are equally applicable here. In addition, similar embodiments may be also applicable in a licensed scenario.

FIG. 1 is a flowchart illustrating an exemplary signaling according to an embodiment of the present disclosure. The diagram in FIG. 1 may represent a simplified architecture of a terminal device such as a UE which may be connected to a network node such as a base station in a wireless communication network. For simplicity, the device architecture of FIG. 1 only depicts some exemplary components such as gNB transmitting some signals to the UE the UE transmitting some signals the gNB, and the gNB and UE performing some operations. In practice, a terminal device according to some embodiments of the present disclosure may further include any additional elements or components suitable to support communication between the terminal device and a network node (such as a gNB) or another terminal device.

The proposed solution is to configure a UE to measure multiple LBT channels of e.g. a neighboring cell and furthermore to generate the measurement report carrying channel specific results. The UE may be configured to trigger the measurement report based on a joint consideration of the radio quality and the channel occupancy. FIG. 1 shows a flow chart of measurement report procedure which comprises steps such as configuring, measuring and reporting steps.

As shown in FIG. 1, the gNB may send a channel specific measurement configuration for neighbor cells. Once the UE receives this configuration, it may perform CO measurements for every channel of each configured neighbor cell respectively. And then, the UE may generate channel measurement results based on the configured filtering policies, and determine if to trigger a measurement report according to the trigger conditions or send report in a periodic fashion. Then the UE may transmit the measurement report to the gNB. The gNB may determine if to trigger a handover or update the RRM configurations for the UE based on the received channel specific measurement reports.

As specified in the 3GPP TS38.331 V15.6.0 clause 5.5.1, the network may configure an RRC_CONNECTED UE to perform measurements and report them in accordance with the measurement configuration. The measurement configuration is provided by means of dedicated signalling i.e. using the RRCReconfiguration or RRCResume.

The network may configure the UE to perform the following types of measurements:

NR measurements;

Inter-Radio Access Technology (RAT) measurements of Evolved Universal Terrestrial Radio Access (E-UTRA) frequencies.

The network may configure the UE to report the following measurement information based on synchronization signals (SS)/physical broadcast channel (PBCH) block(s):
  Measurement results per SS/PBCH block;
  Measurement results per cell based on SS/PBCH block(s); SS/PBCH block(s) indexes.

The network may configure the UE to report the following measurement information based on Channel State Information Reference Signal (CSI-RS) resources:
  Measurement results per CSI-RS resource;
  Measurement results per cell based on CSI-RS resource(s);
  CSI-RS resource measurement identifiers.

The measurement procedures distinguish the following types of cells:
  1. The NR serving cell(s)—these are the Special Cell (SpCell) and one or more Secondary Cells (SCells).
  2. Listed cells—these are cells listed within the measurement object(s).
  3. Detected cells—these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells.

In NR-DC, the UE may receive two independent measConfig:
  a measConfig, associated with Master Cell Group (MCG), that is included in the RRCReconfiguration message received via SRB1; and
  a measConfig, associated with Secondary Cell Group (SCG), that is included in the RRCReconfiguration message received via SRB3, or, alternatively, included within a RRCReconfiguration message embedded in a RRCReconfiguration message received via SRB1.

In 3GPP TS 38.331 V15.6.0, which is cited here, the Information Element (IE) MeasConfig to configure the user equipment (UE) measurement is defined as the following:

```
MeasConfig ::=                    SEQUENCE {
    measObjectToRemoveList            MeasObjectToRemoveList           OPTIONAL, -- Need N
    measObjectToAddModList            MeasObjectToAddModList           OPTIONAL, -- Need N
    reportConfigToRemoveList          ReportConfigToRemoveList         OPTIONAL, -- Need N
    reportConfigToAddModList          ReportConfigToAddModList         OPTIONAL, -- Need N
    measIdToRemoveList                MeasIdToRemoveList               OPTIONAL, -- Need N
    measIdToAddModList                MeasIdToAddModList               OPTIONAL, -- Need N
    s-MeasureConfig                   CHOICE {
        ssb-RSRP                          RSRP-Range,
        csi-RSRP                          RSRP-Range
    }                                                                  OPTIONAL, -- Need M
    quantityConfig                    QuantityConfig                   OPTIONAL, -- Need M
    measGapConfig                     MeasGapConfig                    OPTIONAL, -- Need M
    measGapSharingConfig              MeasGapSharingConfig             OPTIONAL, -- Need M
    ...
}
MeasObjectToRemoveList ::=         SEQUENCE (SIZE (1..maxNrofObjectId)) OF MeasObjectId
MeasIdToRemoveList ::=             SEQUENCE (SIZE (1..maxNrofMeasId)) OF MeasId
ReportConfigToRemoveList ::=       SEQUENCE (SIZE (1..maxReportConfigId)) OF ReportConfigId
```

The measurement object for NR is provided below, and is also described in 3GPP TS 38.331 V15.5.1, which is cited here.

```
MeasObjectNR ::=                   SEQUENCE {
    ssbFrequency                       ARFCN-ValueNR                    OPTIONAL, -- Cond SSBorAssociatedSSB
    ssbSubcarrierSpacing               SubcarrierSpacing                OPTIONAL, -- Cond SSBorAssociatedSSB
    smtc1                              SSB-MTC                          OPTIONAL, -- Cond SSBorAssociatedSSB
    smtc2                              SSB-MTC2                         OPTIONAL, -- Cond IntraFreqConnected
    refFreqCSI-RS                      ARFCN-ValueNR                    OPTIONAL, -- Cond CSI-RS
    referenceSignalConfig              ReferenceSignalConfig,
    absThreshSS-BlocksConsolidation    ThresholdNR                      OPTIONAL, -- Need R
    absThreshCSI-RS-Consolidation      ThresholdNR                      OPTIONAL, -- Need R
    nrofSS-BlocksToAverage             INTEGER (2..maxNrofSS-BlocksToAverage)        OPTIONAL, -- Need R
    nrofCSI-RS-ResourcesToAverage      INTEGER (2..maxNrofCSI-RS-ResourcesToAverage) OPTIONAL, -- Need R
    quantityConfigIndex                INTEGER (1..maxNrofQuantityConfig),
    offsetMO                           Q-OffsetRangeList,
    cellsToRemoveList                  PCI-List                         OPTIONAL, -- Need N
    cellsToAddModList                  CellsToAddModList                OPTIONAL, -- Need N
    blackCellsToRemoveList             PCI-RangeIndexList               OPTIONAL, -- Need N
    blackCellsToAddModList             SEQUENCE (SIZE (1..maxNrofPCI-Ranges)) OF     OPTIONAL, -- Need N
                                         PCI-RangeElement
    whiteCellsToRemoveList             PCI-RangeIndexList               OPTIONAL, -- Need N
    whiteCellsToAddModList             SEQUENCE (SIZE (1..maxNrofPCI-Ranges)) OF     OPTIONAL, -- Need N
                                         PCI-RangeElement
    ... ,
```

```
[[
freqBandIndicatorNR-v1530          FreqBandIndicatorNR                              OPTIONAL, -- Need R
measCycleSCell-v1530               ENUMERATED {sf160, sf256, sf320, sf512, sf640, sf1024,    OPTIONAL -- Need R
                                   sf1280}
]]
}
ReferenceSignalConfig::=           SEQUENCE {
    ssb-ConfigMobility                 SSB-ConfigMobility                           OPTIONAL, -- Need M
    csi-rs-ResourceConfigMobility      SetupRelease { CSI-RS-ResourceConfigMobility }    OPTIONAL -- Need M
}
SSB-ConfigMobility::=              SEQUENCE {
    ssb-ToMeasure                      SetupRelease { SSB-ToMeasure }               OPTIONAL, -- Need M
    deriveSSB-IndexFromCell            BOOLEAN,
    ss-RSSI-Measurement                SS-RSSI-Measurement                          OPTIONAL, -- Need M
    ...
}
Q-OffsetRangeList ::=              SEQUENCE {
    rsrpOffsetSSB                      Q-OffsetRange    DEFAULT dB0,
    rsrqOffsetSSB                      Q-OffsetRange    DEFAULT dB0,
    sinrOffsetSSB                      Q-OffsetRange    DEFAULT dB0,
    rsrpOffsetCSI-RS                   Q-OffsetRange    DEFAULT dB0,
    rsrqOffsetCSI-RS                   Q-OffsetRange    DEFAULT dB0,
    sinrOffsetCSI-RS                   Q-OffsetRange    DEFAULT dB0
}
ThresholdNR ::=                    SEQUENCE{
    thresholdRSRP                      RSRP-Range                                   OPTIONAL, -- Need R
    thresholdRSRQ                      RSRQ-Range                                   OPTIONAL, -- Need R
    thresholdSINR                      SINR-Range                                   OPTIONAL -- Need R
}
```

Figure 2:
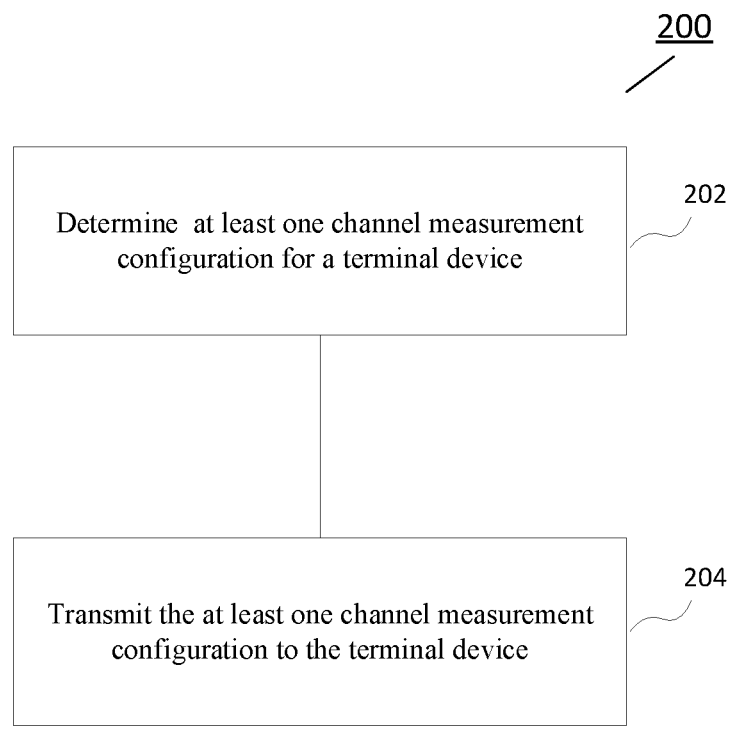
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by an apparatus implemented in a network node or communicatively coupled to a network node.

In accordance with an exemplary embodiment, the network node such as a gNB may determine at least one channel measurement configuration for a terminal device, as shown in block 202. In accordance with an exemplary embodiment, the channel measurement configuration may comprise configuring the terminal device to measure a channel occupancy (CO) of at least one channel, the channel may be a listen before talk (LBT) channel Here, the LBT channel may be a bandwidth segment of a neighboring cell of the terminal device, or the LBT channel is a bandwidth segment of a carrier. The channel measurement configuration may comprise at least one of: measurement object, reporting configuration, measurement identity, quantity configuration, and measurement gap, and the measurement object may comprise at least one of: frequency or time location, subcarrier spacing of reference signal to be measured, and single carrier frequency, and the frequency or time location may comprise channel frequency and/or channel frequency offset.

To be specific, the measurement configuration may include the following parameters:
1. Measurement objects: A list of objects on which the UE shall perform the measurements.
   For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
   The measObjectId of the MO which corresponds to each serving cell is indicated by servingCellMO within the serving cell configuration.
   For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
2. Reporting configurations: A list of reporting configurations where there can be one or multiple reporting configurations per measurement object. Each reporting configuration consists of the following:
   Reporting criterion: The criterion that triggers the UE to send a measurement report. This can either be periodical or a single event description.
   RS type: The RS that the UE uses for beam and cell measurement results (SS/PBCH block or CSI-RS).
   Reporting format: The quantities per cell and per beam that the UE includes in the measurement report (e.g. RSRP) and other associated information such as the maximum number of cells and the maximum number beams per cell to report.
3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.
4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A user equipment (UE) in RRC_CONNECTED maintains a measurement object list, a reporting configuration list, and a measurement identities list. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

conveyed via a measurement configuration RRC signaling. In this case, multiple measurement objects for a channel list in a cell/carrier may be configured to the UE, and each of measurement object maybe associated with a specific channel. When the channel list is conveyed to a UE, the UE should perform the channel occupancy measurements for all the configured channels respectively. When the channel list is not conveyed to a UE and the UE is configured to report the channel occupancy, the UE only measures the channel occupancy for the channel where the SSBs are located.

Below are several examples on how to configure channel specific CO measurement for a UE.

In an example, a channel frequency array is added into MeasObjectNR to configure the channels for occupancy measurement of a carrier. The line of channelFrequency is used to indicate the frequencies of the channels to be measured.

```
MeasObjectNR ::=           SEQUENCE {
    ssbFrequency               ARFCN-ValueNR           OPTIONAL, -- Cond SSBorAssociatedSSB
    channelFrequency              SEQUENCE (SIZE (1..maxNrofChannels) OF ARFCN-VALUENR   OPTIONAL,
    ssbSubcarrierSpacing       SubcarrierSpacing       OPTIONAL, -- Cond SSBorAssociatedSSB
    smtc1                      SSB-MTC                 OPTIONAL, -- Cond SSBorAssociatedSSB
    smtc2                      SSB-MTC2                OPTIONAL, -- Cond IntraFreqConnected
    ... ...
}
MeasObjectNR ::=           SEQUENCE {
    ssbFrequency               ARFCN-ValueNR           OPTIONAL, -- Cond SSBorAssociatedSSB
    channelFrequencyOffset        SEQUENCE (SIZE (1..maxNrofChannels) OF Integer      OPTIONAL,
    ssbSubcarrierSpacing       SubcarrierSpacing       OPTIONAL, -- Cond SSBorAssociatedSSB
    smtc1                      SSB-MTC                 OPTIONAL, -- Cond SSBorAssociatedSSB
    smtc2                      SSB-MTC2                OPTIONAL, -- Cond IntraFreqConnected
    ... ...
}
```

In another example, a frequency offset array relative to the SSB frequency can be added into the MeasObjectNR to configure the channels for occupancy measurement of a carrier.

```
MeasObjectNR ::=           SEQUENCE {
    ssbFrequency               ARFCN-ValueNR           OPTIONAL, -- Cond SSBorAssociatedSSB
    channelFrequencyOffset        SEQUENCE (SIZE (1..maxNrofChannels) OF Integer   OPTIONAL,
    ssbSubcarrierSpacing       SubcarrierSpacing       OPTIONAL, -- Cond SSBorAssociatedSSB
    smtc1                      SSB-MTC                 OPTIONAL, -- Cond SSBorAssociatedSSB
    smtc2                      SSB-MTC2                OPTIONAL, -- Cond IntraFreqConnected
    ... ...
}
    ssbSubcarrierSpacing       SubcarrierSpacing       OPTIONAL, -- Cond SSBorAssociatedSSB
    smtc1                      SSB-MTC                 OPTIONAL, -- Cond SSBorAssociatedSSB
    smtc2                      SSB-MTC2                OPTIONAL, -- Cond IntraFreqConnected
    ... ...
}
```

According to the exemplary method 200 illustrated in FIG. 2, the network node such as a gNB can, as shown in block 204, transmit the at least one channel measurement configuration to the terminal device, e.g. via Radio Resource Control (RRC) signaling.

In accordance with another exemplary embodiment, the at least one channel measurement configuration is associated with a list of LBT channels of a carrier or a cell, the at least one channel measurement configuration may comprise multiple measurement objects, and each of measurement object is associated with an LBT channel.

In accordance with an exemplary embodiment, the UE is configured by its serving gNB to measure a list of LBT channels of a carrier or a neighbor cell. The configuration is According to the exemplary method 200, the network node such as a gNB can further receive at least one channel measurement report for the CO measurement result of the at least one LBT channel.

In accordance with another exemplary embodiment, the channel measurement report comprises CO measurement result of one LBT channel, average CO measurement result of all configured LBT channels of a cell or carrier, and/or respective CO measurement result of all configured LBT channels of a cell or carrier.

In another example, when a UE is configured with more than one channels for channel occupancy measurement, the UE can be configured to report the measurement results of channel occupancy using at least one of the following options:

Option 1: the UE reports CO measurement result for only one channel. In one alternative, the UE reports the CO measurement results for the channel with lowest CO value. In another alternative the UE reports the CO measurement results for the channel with highest CO value. The RRC information element is exemplified below:

```
MeasResultNR ::=                SEQUENCE {
    physCellId                      PhysCellId                              OPTIONAL,
    measResult                      SEQUENCE {
        cellResults                     SEQUENCE{
            resultsSSB-Cell                 MeasQuantityResults                 OPTIONAL,
            resultsCSI-RS-Cell              MeasQuantityResults                 OPTIONAL,
              resultsChannelOccupancy         ChannelOccupancyRange               OPTIONAL
        },
        rsIndexResults                  SEQUENCE{
            resultsSSB-Indexes              ResultsPerSSB-IndexList             OPTIONAL,
            resultsCSI-RS-Indexes           ResultsPerCSI-RS-IndexList          OPTIONAL,
        resultsChannelIndex             INTEGER(1,2,...,maxNrofChannels)    OPTIONAL
        }                                                                   OPTIONAL
    },
    ...,
    [[
    cgi-Info                        CGI-Info                                OPTIONAL
    ]]
}
```

Option 2: the UE reports an average channel occupancy of all configured channels of a cell/carrier The RRC information element is exemplified below:

```
MeasResultNR ::=                SEQUENCE {                                  OPTIONAL,
    physCellId                      PhysCellId
    measResult                      SEQUENCE {
        cellResults                     SEQUENCE {
            resultsSSB-Cell                 MeasQuantityResults                 OPTIONAL,
            resultsCSI-RS-Cell              MeasQuantityResults                 OPTIONAL,
              resultsChannelOccupany          ChannelOccupancyRange               OPTIONAL
        },
        rsIndexResults                  SEQUENCE{
            resultsSSB-Indexes              ResultsPerSSB-IndexList             OPTIONAL,
            resultsCSI-RS-Indexes           ResultsPerCSI-RS-IndexList          OPTIONAL,
        }                                                                   OPTIONAL
    },
    ...,
    [[
    cgi-Info                        CGI-Info                                OPTIONAL
    ]]
}
```

Option 3: the respective channel occupancy values for all configured channels are reported. In this option, the measurement results of all channels may be organized in a way that the channel index of each channel can be indicated. In one way, an explicit channel index is added to the measurement result field. In another way, the measurement results are sorted following an increasing order of the channel indices. In this way, the first element of measurement results is for channel 1, the second element of measurement results is for channel 2, and so on. The information element to indicate the channel occupancy for a set of channels is exemplified below:

```
            MeasResultNR ::=                SEQUENCE {
                physCellId                      PhysCellId                                              OPTIONAL,
                measResult                      SEQUENCE {
                    cellResults                     SEQUENCE{
                        resultsSSB-Cell                 MeasQuantityResults                 OPTIONAL,
                        resultsCSI-RS-Cell              MeasQuantityResults                 OPTIONAL,
                          resultsChannelOccupany         SEQUENCE (1,2,...,maxNrofChannels) of ChannelOccupancyRange    OPTIONAL
                    },
```

| | | |
|---|---|---|
| rsIndexResults | SEQUENCE{ | |
|   resultsSSB-Indexes | ResultsPerSSB-IndexList | OPTIONAL, |
|   resultsCSI-RS-Indexes | ResultsPerCSI-RS-IndexList | OPTIONAL, |
|   } | | OPTIONAL |
| }, | | |
| ..., | | |
| [[ | | |
| cgi-Info | CGI-Info | OPTIONAL |
| ]] | | |
| } | | |

Which option of above is used can be either predefined or configured via an indicator in a signaling sent by the gNB.

In accordance with an exemplary embodiment, the channel measurement report is received in one of the following ways: a periodical way, an event triggered way, and a configured triggering condition way.

That is, it is also worth noting that channel specific measurement can be triggered either in a periodical fashion or in an event trigger fashion. For the second choice, all channels may not trigger measurement report at the same time. In this case, the UE would then formulate a report only based on results of the channels that fulfill the trigger conditions.

In another example, in addition to Periodic and Event-triggered report fashions for CO, some more triggering conditions can be configured for channel specific channel occupancy measurement. In this way, the UE is avoided to send CO measurement reports too frequently, so to reduce the signaling overhead. There are several options to achieve this goal:

Option 1. The UE can report the channel occupancy of a neighboring cell/channel upon the request (or polling) from the serving cell. The request or polling message can be conveyed to the UE via any of RRC signaling, MAC CE and DCI signaling.

Option 2. The UE is configured to send a measurement report for channel occupancy of a neighboring cell/channel by checking multiple trigger conditions/metrics in a combined fashion. In one example, when the channel occupancy of a neighboring cell/channel is lower than a first preconfigured threshold for a configured time and the RSRP (or SSB or CSI-RS SINR) of this neighboring cell/channel is higher than a second preconfigured threshold for another configured time, the UE can send a measurement report carrying the CO measurement results.

Option 3. Based on measured SINR and CO, the UE can estimate the available capacity for a channel according to the below formula.

$$C = CO * B * \log 2(1+SINRi)$$

Wherein C denotes the available capacity, CO is the measured CO for the corresponding channel, B is the channel bandwidth and SINRi is the SINR of channel i. CO can indicate the ratio of idle slots within a period for a channel. Only when the capacity of the best channel or the total capacity of the configured channels of a carrier is sufficiently large, e.g. larger than the date rate scheduled in the current serving cell/channel for this UE, the UE can trigger a measurement report carrying channel occupancy. It means that the gNB has enough free capacity to schedule this UE. In this case, sending a CO measurement report to the gNB, would be helpful for the gNB to make more efficient scheduling decision to the UE.

The gNB can configure which option is to be used for the UE using system information, a dedicated RRC signaling, a MAC CE or a DCI signaling.

In accordance with another exemplary embodiment, the channel measurement configuration comprises at least one of: a channel measurement mode and a full bandwidth measurement mode.

According to the exemplary method 200, the network node such as a gNB can further transmit a signal indicating the terminal device to switch between the channel measurement mode and the full bandwidth measurement mode.

In another example, in a BWP/carrier/cell containing multiple channels, for every UE serving in the BWP/carrier/cell, the gNB is able to configure the UE to measure CO per channel or per BWP/carrier/cell. In case the UE is configured to measure CO per BWP/carrier/cell, the UE would then measure CO in the full bandwidth of the BWP/carrier/cell regardless how many channels are configured in the BWP/carrier/cell. The UE may be signaled to switch between channel specific CO measurement mode and full bandwidth-based CO measurement mode. The signaling may be sent by the gNB to the UE via at least one of below options:

Option 1: one indicator indicating the measurement mode (i.e., channel specific CO measurement or full bandwidth-based CO measurement) carried in the system information is signaled in the cell.

Option 2: one indicator indicating the measurement mode (i.e., channel specific CO measurement or full bandwidth-based CO measurement) carried in a dedicated RRC signaling message is sent to the UE.

Option 3: the gNB sends new measurement configurations for CO to the UE to replace the old configurations. The new configurations indicate to the UE on the CO measurement mode.

Option 4: the gNB sends a MAC CE to the UE indicating the new CO measurement mode.

Option 5: the gNB sends a DCI signaling to the UE indicating the new CO measurement mode.

As another additional alternative, the UE may choose a CO measurement mode considering at least one of below factors:

the service/traffic type that the UE carries. For a delay sensitive service, the UE may perform LBT operation per channel so the UE may occupy a subset of channels for data transfer in case the UE can not occupy the full bandwidth, in this case, it is beneficial for the UE to choose channel specific CO measurement mode. Vice versa, for a delay non sensitive service, the UE may perform LBT operation per full bandwidth. The UE may take longer time to occupy the full bandwidth after multiple LBT attempts. In this case, it is beneficial for the UE to measure CO at the full bandwidth level.

mobility status of the UE (i.e., low, medium or high speed). For a UE at high mobility state, it may be challenging for the UE to measure CO in a narrow bandwidth. In this case, the UE can measure CO for full bandwidth. The UE may measure CO per channel only in low mobility state.

UE's capability and/or battery life. A UE capability bit may be defined to indicate if the UE support channel specific CO measurement or full bandwidth CO measurement. The CO measurement activity may also affect the UE battery life. In case a UE has sufficient remaining battery life time, the UE may measure CO per channel. However, a UE with insufficient remaining battery life time, the UE may measure CO per full bandwidth. The gNB may configure a threshold of remaining battery time to a UE. The UE chooses to perform channel specific CO measurement or full bandwidth CO measurement depending on if its remaining battery time is above or below the threshold. The threshold may be an absolute value of the time or a relative ratio (i.e., ratio of the remaining battery life time compared to the full battery life time).

As soon as the UE selects a CO measurement mode, the UE may need to send a signaling inform its gNB of the selected mode.

The Radio Resource Management (RRM) procedures in NR-U would be generally rather similar as in License Assisted Access (LAA). Channel access/selection for LAA was one of important aspects for co-existence with other RATs such as Wi-Fi. For instance, LAA has aimed to use carriers that are congested with Wi-Fi. Therefore, RRM measurements as one critical aspect has been designed are critical for the congestion avoidance purpose.

Figure 4:
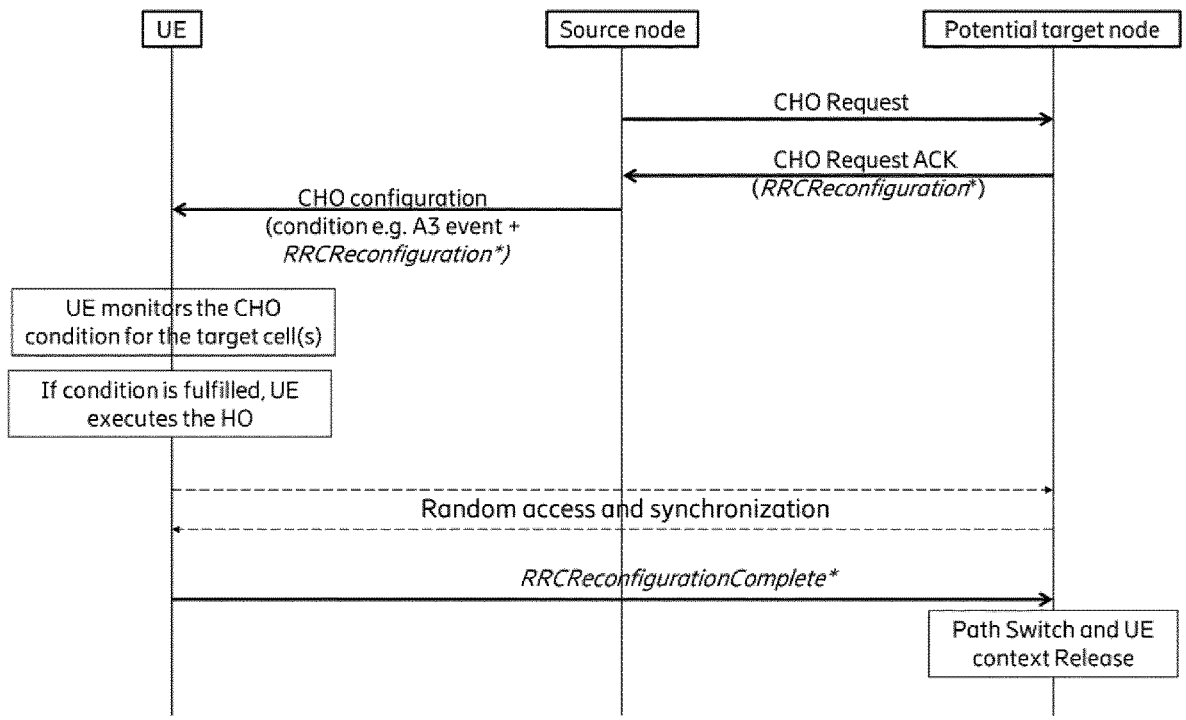
FIG. 4 is a flowchart illustrating another exemplary signaling according to some embodiments of the present disclosure.

As described in 3GPP R2-1900404, Conditional handover in NR, Ericsson, 3GPP TSG RAN WG2 #105, in conditional handover the network configures the UE with triggering conditions for when a handover should be executed. When the conditions are fulfilled, the UE executes the handover without any further order from the network. The advantage of the procedure is that the HO Command may be provided to the UE at an earlier stage before the radio conditions have become poor, which increases the chance of a successful transmission of the message. The basic signaling flow for conditional handover is shown in FIG. 4.

According to the exemplary method 200, the network node such as a gNB can further determine a trigger criteria for a handover or update Radio Resource Management (RRM) configuration for the terminal device based on the received at least one channel measurement report.

In accordance with another exemplary embodiment, the handover comprises conditional handover (CHO) and the trigger criteria for the handover comprises at least one of: Reference Signal Receiving Power (RSRP), Reference Signal Receiving Quality (RSRQ), Signal to Interference plus Noise Ratio (SINR) and CO measurement result.

In another example, during a handover procedure of a UE, the handover request message can carry the UE's CO measurement results of a target cell. Upon reception of the results, the target cell can allocate resources for the coining handover. The resource assignment may be confined within a specific LBT channel. If the assigned RA resources are located in a specific channel, the source cell may indicate the RA resources and the associated channel in the target cell to the UE. UE chooses the channel to perform a RA to access the target cell accordingly.

In another example, for conditional handover (CHO), the UE may be configured with trigger criteria including both the ordinary metrics (in terms of RSRP, RSRQ, or SINR etc.) and CO. In case there are multiple trigger conditions are fulfilled at the same time, the UE may adopt at least one of below options to choose a CHO candidate cell:

Option 1: a priority order between trigger conditions is configured by the gNB or defined in the spec in a hard-coded fashion. For the former choice, the gNB may send signaling via system information, a dedicated RRC signaling, a MAC CE or a DCI signaling. According to the priority order, the UE initiates a RA to each CHO candidate cell accordingly. If the UE fails to connect to the first CHO candidate cell, the UE would try to connect to the second CHO candidate cell and so on until the connection is successfully established.

Option 2: the UE selects a CHO candidate by checking several conditions together. The UE first select a set of CHO candidate cells which meet the other ordinary trigger condition (e.g., in terms of RSRP, RSRQ or SINR etc), the UE then further selects the CHO candidate to initiate RA which has the lowest CO in the set.

Figure 3:
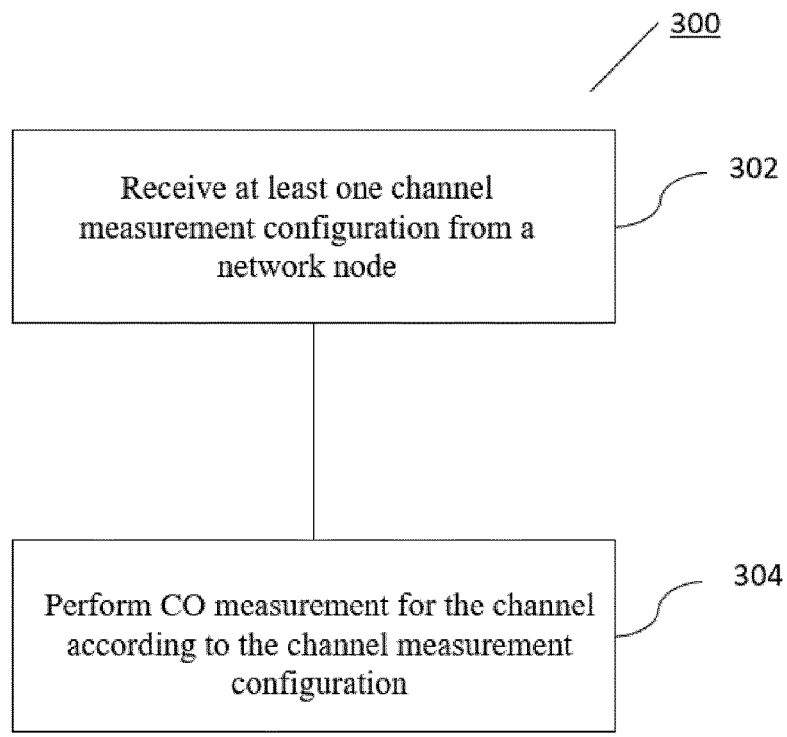
FIG. 3 is a flowchart illustrating another method according to some embodiments of the present disclosure.

FIG. 3 is a flowchart illustrating a method 300 according to some embodiments of the present disclosure. As described in connection with FIG. 2, the method 300 illustrated in FIG. 3 may be performed by an apparatus implemented in a terminal device or communicatively coupled to a terminal device.

In accordance with an exemplary embodiment, the terminal device such as a UE may receive at least one channel measurement configuration from a network node, e.g. via Radio Resource Control (RRC) signaling, as shown in block 302. In accordance with an exemplary embodiment, the channel measurement configuration comprises configuring the terminal device to measure a channel occupancy (CO) of at least one channel, the channel may be a listen before talk (LBT) channel.

To be specific, the measurement configuration may include the following parameters:
1. Measurement objects: A list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A user equipment (UE) in RRC_CONNECTED maintains a measurement object list, a reporting configuration list, and a measurement identities list. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

According to the exemplary method 300 illustrated in FIG. 3, the terminal device such as a UE can, as shown in block 304, perform CO measurement for the LBT channel according to the channel measurement configuration, and the performing may comprise performing CO measurement for all configured LBT channels when the terminal device received an LBT channel list; or performing CO measurement for LBT channels where the Synchronization Signal Block (SSB) is located.

According to the exemplary method 300, the terminal device such as a UE can further obtain at least one channel measurement result.

According to the exemplary method 300, the terminal device such as a UE can further determine whether to trigger a channel measurement report. The channel measurement report may comprise CO measurement result of one LBT channel, average CO measurement result of all configured LBT channels of a cell or carrier, and/or respective CO measurement result of all configured LBT channels of a cell or carrier.

According to the exemplary method 300, the terminal device such as a UE can further transmit at least one channel measurement report for the CO measurement result of the at least one LBT channel.

In accordance with an exemplary embodiment, the LBT channel is a bandwidth segment of a neighboring cell of the terminal device, or the LBT channel is a bandwidth segment of a carrier.

In accordance with an exemplary embodiment, the channel measurement configuration comprises at least one of: measurement object, reporting configuration, measurement identity, quantity configuration, and measurement gap.

In accordance with an exemplary embodiment, the measurement object comprises at least one of: frequency or time location, subcarrier spacing of reference signal to be measured, and single carrier frequency.

In accordance with an exemplary embodiment, the frequency or time location comprises channel frequency and/or channel frequency offset.

In accordance with an exemplary embodiment, the at least one channel measurement configuration is associated with a list of LBT channels of a carrier or a cell, the at least one channel measurement configuration comprises multiple measurement objects, and each of measurement object is associated with an LBT channel.

In accordance with an exemplary embodiment, the UE is configured by its serving gNB to measure a list of LBT channels of a carrier or a neighbor cell. The configuration is conveyed via a measurement configuration RRC signaling. In this case, multiple measurement objects for a channel list in a cell/carrier may be configured to the UE, and each of measurement object maybe associated with a specific channel. When the channel list is conveyed to a UE, the UE should perform the channel occupancy measurements for all the configured channels respectively. When the channel list is not conveyed to a UE and the UE is configured to report the channel occupancy, the UE only measures the channel occupancy for the channel where the SSBs are located.

Below are several examples on how to configure channel specific CO measurement for a UE.

In an example, a channel frequency array is added into MeasObjectNR to configure the channels for occupancy measurement of a carrier. The line of channelFrequency is used to indicate the frequencies of the channels to be measured.

```
MeasObjectNR ::=       SEQUENCE {
    ssbFrequency          ARFCN-ValueNR                              OPTIONAL, -- Cond SSBorAssociatedSSB
    channelFrequency           SEQUENCE (SIZE (1..maxNrofChannels) OF ARFCN-VALUENR   OPTIONAL,
    ssbSubcarrierSpacing       SubcarrierSpacing                     OPTIONAL, -- Cond SSBorAssociatedSSB
    smtc1                      SSB-MTC                               OPTIONAL, -- Cond SSBorAssociatedSSB
    smtc2                      SSB-MTC2                              OPTIONAL, -- Cond IntraFreqConnected
    ... ...
}
```

```
MeasObjectNR ::=          SEQUENCE {
   ssbFrequency              ARFCN-ValueNR          OPTIONAL, -- Cond SSBorAssociatedSSB
   channelFrequencyOffset       SEQUENCE (SIZE (1..maxNrofChannels) OF Integer    OPTIONAL,
   ssbSubcarrierSpacing      SubcarrierSpacing      OPTIONAL, -- Cond SSBorAssociatedSSB
   smtc1                     SSB-MTC                OPTIONAL, -- Cond SSBorAssociatedSSB
   smtc2                     SSB-MTC2               OPTIONAL, -- Cond IntraFreqConnected
   ... ...
}
```

In another example, a frequency offset array relative to the SSB frequency can be added into the MeasObjectNR to configure the channels for occupancy measurement of a carrier.

```
MeasObjectNR ::=          SEQUENCE {
   ssbFrequency              ARFCN-ValueNR          OPTIONAL, -- CondSSBorAssociatedSSB
   channelFrequencyOffset       SEQUENCE (SIZE (1..maxNrofChannels) OF Integer    OPTIONAL,
   ssbSubcarrierSpacing      SubcarrierSpacing      OPTIONAL, -- Cond SSBorAssociatedSSB
   smtc1                     SSB-MTC                OPTIONAL, -- Cond SSBorAssociatedSSB
   smtc2                     SSB-MTC2               OPTIONAL, -- Cond IntraFreqConnected
   ... ...
}
   ssbSubcarrierSpacing      SubcarrierSpacing      OPTIONAL, -- Cond SSBorAssociatedSSB
   smtc1                     SSB-MTC                OPTIONAL, -- Cond SSBorAssociatedSSB
   smtc2                     SSB-MTC2               OPTIONAL, -- Cond IntraFreqConnected
     ... ...
   }
```

In accordance with an exemplary embodiment, the step performing (304) may further comprises performing CO measurement for all configured LBT channels when the terminal device received an LBT channel list, or performing CO measurement for LBT channels where the Synchronization Signal Block, SSB, is located.

In accordance with an exemplary embodiment, the channel measurement report comprises CO measurement result of one LBT channel, average CO measurement result of all configured LBT channels of a cell or carrier, and/or respective CO measurement result of all configured LBT channels of a cell or carrier.

In another example, when a UE is configured with more than one channels for channel occupancy measurement, the UE can be configured to report the measurement results of channel occupancy using at least one of the following options:

Option 1: the UE reports CO measurement result for only one channel. In one alternative, the UE reports the CO measurement results for the channel with lowest CO value. In another alternative the UE reports the CO measurement results for the channel with highest CO value. The RRC information element is exemplified below:

```
MeasResultNR ::=           SEQUENCE {
   physCellId                  PhysCellId                        OPTIONAL,
   measResult                  SEQUENCE {
      cellResults                 SEQUENCE{
         resultsSSB-Cell             MeasQuantityResults          OPTIONAL,
         resultsCSI-RS-Cell          MeasQuantityResults          OPTIONAL,
            resultsChannelOccupany       ChannelOccupancyRange    OPTIONAL
      },
      rsIndexResults              SEQUENCE{
         resultsSSB-Indexes          ResultsPerSSB-IndexList      OPTIONAL,
         resultsCSI-RS-Indexes       ResultsPerCSI-RS-IndexList   OPTIONAL,
      resultsChannelIndex         INTEGER(1,2,...,maxNrofChannels) OPTIONAL
      }                                                           OPTIONAL
   },
   ...,
   [[
   cgi-Info                    CGI-Info                          OPTIONAL
   ]]
}
```

Option 2: the UE reports an average channel occupancy of all configured channels of a cell/carrier The RRC information element is exemplified below:

```
MeasResultNR ::=            SEQUENCE {                              OPTIONAL,
  physCellId                    PhysCellId
  measResult                    SEQUENCE {
    cellResults                   SEQUENCE {                        OPTIONAL,
      resultsSSB-Cell               MeasQuantityResults             OPTIONAL,
      resultsCSI-RS-Cell            MeasQuantityResults             OPTIONAL
        resultsChannelOccupany        ChannelOccupancyRange
    },
    rsIndexResults                SEQUENCE{
      resultsSSB-Indexes              ResultsPerSSB-IndexList       OPTIONAL,
      resultsCSI-RS-Indexes           ResultsPerCSI-RS-IndexList    OPTIONAL,
    }                                                               OPTIONAL
  },
  ...,
  [[
  cgi-Info                    CGI-Info                              OPTIONAL
  ]]
}
```

Option 3: the respective channel occupancy values for all configured channels are reported. In this option, the measurement results of all channels may be organized in a way that the channel index of each channel can be indicated. In one way, an explicit channel index is added to the measurement result field. In another way, the measurement results are sorted following an increasing order of the channel indices. In this way, the first element of measurement results is for channel 1, the second element of measurement results is for channel 2, and so on. The information element to indicate the channel occupancy for a set of channels is exemplified below:

```
MeasResultNR ::=            SEQUENCE {
  physCellId                    PhysCellId                                      OPTIONAL,
  measResult                    SEQUENCE {
    cellResults                   SEQUENCE{
      resultsSSB-Cell               MeasQuantityResults                         OPTIONAL,
      resultsCSI-RS-Cell            MeasQuantityResults                         OPTIONAL,
        resultsChannelOccupany    SEQUENCE (1,2,...,maxNrofChannels) of ChannelOccupancyRange   OPTIONAL
    },
    rsIndexResults                SEQUENCE{
      resultsSSB-Indexes              ResultsPerSSB-IndexList                   OPTIONAL,
      resultsCSI-RS-Indexes           ResultsPerCSI-RS-IndexList                OPTIONAL,
    }                                                                           OPTIONAL
  },
  ...,
  [[
  cgi-Info                    CGI-Info                                          OPTIONAL
  ]]
}
```

Which option of above is used can be either predefined or configured via an indicator in a signaling sent by the gNB.

In accordance with an exemplary embodiment, the channel measurement report is transmitted in one of the following ways: a periodical way, an event triggered way, and a configured triggering condition way.

That is, it is also worth noting that channel specific measurement can be triggered either in a periodical fashion or in an event trigger fashion. For the second choice, all channels may not trigger measurement report at the same time. In this case, the UE would then formulate a report only based on results of the channels that fulfill the trigger conditions.

In another embodiment, in addition to Periodic and Event-triggered report fashions for CO, some more triggering conditions can be configured for channel specific channel occupancy measurement. In this way, the UE is avoided to send CO measurement reports too frequently, so to reduce the signaling overhead. There are several options to achieve this goal:

Option 1. The UE can report the channel occupancy of a neighboring cell/channel upon the request (or polling) from the serving cell. The request or polling message can be conveyed to the UE via any of RRC signaling, MAC CE and DCI signaling.

Option 2. The UE is configured to send a measurement report for channel occupancy of a neighboring cell/channel by checking multiple trigger conditions/metrics in a combined fashion. In one example, when the channel occupancy of a neighboring cell/channel is lower than a first preconfigured threshold for a configured time and the RSRP (or SSB or CSI-RS SINR) of this neighboring cell/channel is higher than a second preconfigured threshold for another configured time, the UE can send a measurement report carrying the CO measurement results.

Option 3. Based on measured SINR and CO, the UE can estimate the available capacity for a channel according to the below formula.

$$C = CO * B * \log_2(1 + SINR_i)$$

Wherein C denotes the available capacity, CO is the measured CO for the corresponding channel, B is the channel bandwidth and SINRi is the SINR of channel i. CO can indicate the ratio of idle slots within a period for a channel. Only when the capacity of the best channel or the total capacity of the configured channels of a carrier is sufficiently large, e.g. larger than the date rate scheduled in the current serving cell/channel for this UE, the UE can trigger a measurement report carrying channel occupancy. It means that the gNB has enough free capacity to schedule this UE. In this case, sending a CO measurement report to the gNB, would be helpful for the gNB to make more efficient scheduling decision to the UE.

The gNB can configure which option is to be used for the UE using system information, a dedicated RRC signaling, a MAC CE or a DCI signaling.

In accordance with an exemplary embodiment, the channel measurement configuration comprises at least one of: a channel measurement mode and a full bandwidth measurement mode.

According to the exemplary method 300, the terminal device such as a UE can further receive a signal indicating the terminal device to switch between the channel measurement mode and the full bandwidth measurement mode.

According to the exemplary method 300, the terminal device such as a UE can further switch between the channel measurement mode and the full bandwidth measurement mode based on at least one of: a service or traffic type of the terminal device, mobility status of the terminal device, and capability and/or battery life of the terminal device.

In another example, in a BWP/carrier/cell containing multiple channels, for every UE serving in the BWP/carrier/cell, the gNB is able to configure the UE to measure CO per channel or per BWP/carrier/cell. In case the UE is configured to measure CO per BWP/carrier/cell, the UE would then measure CO in the full bandwidth of the BWP/carrier/cell regardless how many channels are configured in the BWP/carrier/cell. The UE may be signaled to switch between channel specific CO measurement mode and full bandwidth-based CO measurement mode. The signaling may be sent by the gNB to the UE via at least one of below options:

Option 1: one indicator indicating the measurement mode (i.e., channel specific CO measurement or full bandwidth-based CO measurement) carried in the system information is signaled in the cell.

Option 2: one indicator indicating the measurement mode (i.e., channel specific CO measurement or full bandwidth-based CO measurement) carried in a dedicated RRC signaling message is sent to the UE.

Option 3: the gNB sends new measurement configurations for CO to the UE to replace the old configurations. The new configurations indicate to the UE on the CO measurement mode.

Option 4: the gNB sends a MAC CE to the UE indicating the new CO measurement mode.

Option 5: the gNB sends a DCI signaling to the UE indicating the new CO measurement mode.

As another additional alternative, the UE may choose a CO measurement mode considering at least one of below factors:

the service/traffic type that the UE carries. For a delay sensitive service, the UE may perform LBT operation per channel so the UE may occupy a subset of channels for data transfer in case the UE can not occupy the full bandwidth, in this case, it is beneficial for the UE to choose channel specific CO measurement mode. Vice versa, for a delay non sensitive service, the UE may perform LBT operation per full bandwidth. The UE may take longer time to occupy the full bandwidth after multiple LBT attempts. In this case, it is beneficial for the UE to measure CO at the full bandwidth level.

mobility status of the UE (i.e., low, medium or high speed). For a UE at high mobility state, it may be challenging for the UE to measure CO in a narrow bandwidth. In this case, the UE can measure CO for full bandwidth. The UE may measure CO per channel only in low mobility state.

UE's capability and/or battery life. A UE capability bit may be defined to indicate if the UE support channel specific CO measurement or full bandwidth CO measurement. The CO measurement activity may also affect the UE battery life. In case a UE has sufficient remaining battery life time, the UE may measure CO per channel. However, a UE with insufficient remaining battery life time, the UE may measure CO per full bandwidth. The gNB may configure a threshold of remaining battery time to a UE. The UE chooses to perform channel specific CO measurement or full bandwidth CO measurement depending on if its remaining battery time is above or below the threshold. The threshold may be an absolute value of the time or a relative ratio (i.e., ratio of the remaining battery life time compared to the full battery life time).

As soon as the UE selects a CO measurement mode, the UE may need to send a signaling inform its gNB of the selected mode.

In another example, during a handover procedure of a UE, the handover request message can carry the UE's CO measurement results of a target cell. Upon reception of the results, the target cell can allocate resources for the coining handover. The resource assignment may be confined within a specific LBT channel. If the assigned RA resources are located in a specific channel, the source cell may indicate the RA resources and the associated channel in the target cell to the UE. UE chooses the channel to perform a RA to access the target cell accordingly.

In another example, for conditional handover (CHO), the UE may be configured with trigger criteria including both the ordinary metrics (in terms of RSRP, RSRQ, or SINR etc.) and CO. In case there are multiple trigger conditions are fulfilled at the same time, the UE may adopt at least one of below options to choose a CHO candidate cell:

Option 1: a priority order between trigger conditions is configured by the gNB or defined in the spec in a hard-coded fashion. For the former choice, the gNB may send signaling via system information, a dedicated RRC signaling, a MAC CE or a DCI signaling. According to the priority order, the UE initiates a RA to each CHO candidate cell accordingly. If the UE fails to connect to the first CHO candidate cell, the UE would try to connect to the second CHO candidate cell and so on until the connection is successfully established.

Option 2: the UE selects a CHO candidate by checking several conditions together. The UE first select a set of CHO candidate cells which meet the other ordinary trigger condition (e.g., in terms of RSRP, RSRQ or SINR etc), the UE then further selects the CHO candidate to initiate RA which has the lowest CO in the set.

It will be realized that parameters, variables and settings related to the determination, transmission and reception described herein are just examples. Other suitable network settings, the associated configuration parameters and the specific values thereof may also be applicable to implement the proposed methods.

The proposed solution according to one or more exemplary embodiments can make the terminal device (e.g. UE)

be configured to measure channel occupancy (CO) for a LBT channel, so that the UE may be able to provide CO measurements with finer granularity per LBT channel. In addition, A better handover (HO) or RRNI decision upon received CO measurement results may be made for the UE by the gNB especially in case the channels are unequally loaded in the serving cell. In other words, For a wideband BWP/carrier comprising multiple LBT channels, channel specific CO measurement configuration and report may be supported so that the gNB can improve its decision for triggering a HO or updating RRNI parameters. Besides, a good balance between better QoS guarantee and improving power saving of a UE may be achieved.

The various blocks shown in FIG. 2 and FIG. 3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
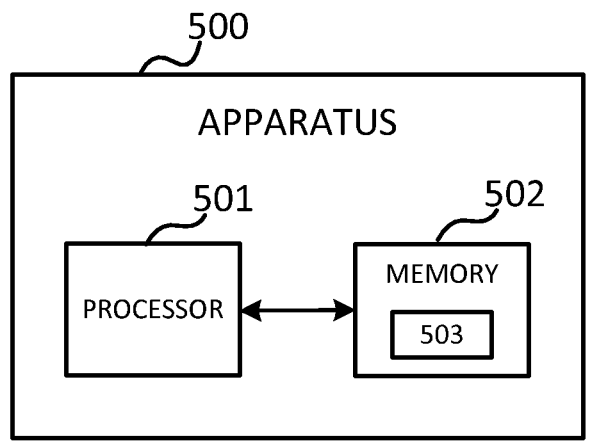
FIG. 5 is a block diagram illustrating another apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501, and one or more memories such as memory 502, storing computer program codes 503. The memory 502 may be non-transitory machine/processor/computer readable storage medium. In accordance with some exemplary embodiments, the apparatus 500 may be implemented as an integrated circuit chip or module that can be plugged or installed into a network node as described with respect to FIG. 2, and a terminal device as described with respect to FIG. 3.

In some implementations, the one or more memories 502, and the computer program codes 503, may be configured to, with the one or more processors 501, cause the apparatus 500 at least to perform any operation of the method as described in connection with FIG. 2. In other implementations, the one or more memories 502, and the computer program codes 503, may be configured to, with the one or more processors 501, cause the apparatus 500 at least to perform any operation of the method as described in connection with FIG. 3.

Figure 6:
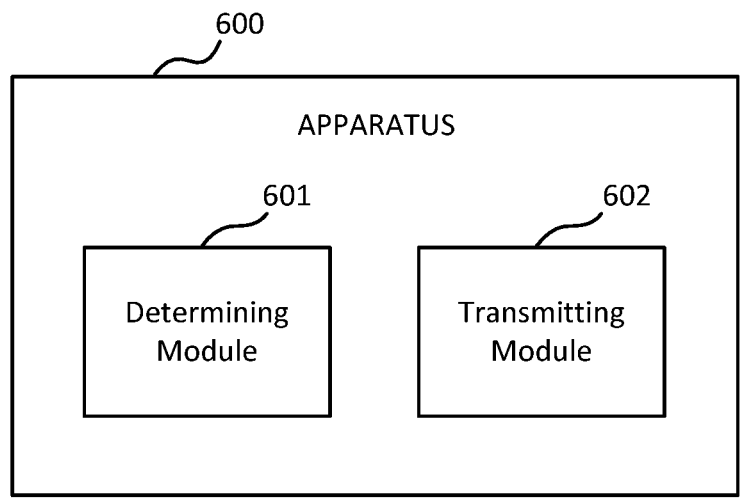
FIG. 6 is a block diagram illustrating yet another apparatus according to some embodiments of the present disclosure.

FIG. 6 is a block diagram illustrating an apparatus 600 according to some embodiments of the present disclosure. As shown in FIG. 6, the apparatus 600 may comprise a determining module 601 and a transmitting module 602. In an exemplary embodiment, the apparatus 600 may be implemented in a network node such as a gNB. The determining module 601 may be operable to carry out the operation in block 202, and the transmitting module 602 may be operable to carry out the operation in block 204. Optionally, the determining module 601 and/or the transmitting module 602 may be operable to carry out more or less operations to implement the proposed methods according to the exemplary embodiments of the present disclosure.

Figure 7:
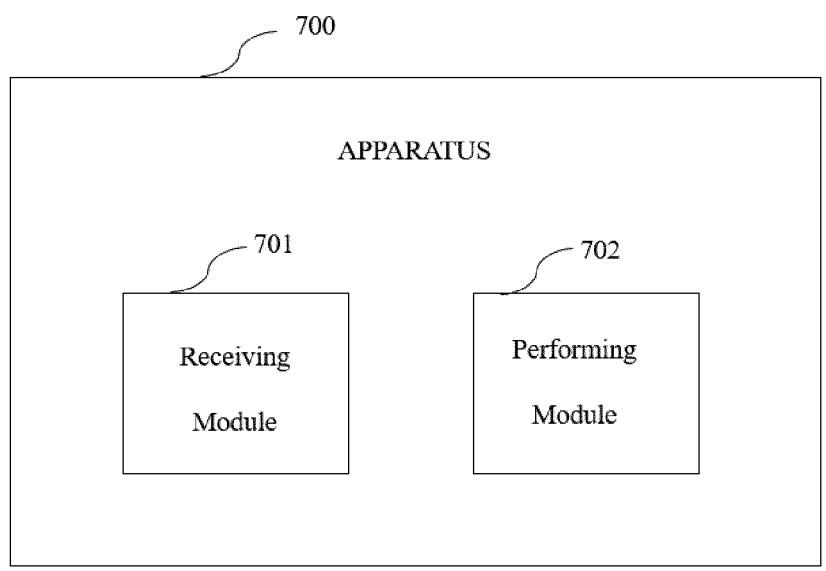
FIG. 7 is a block diagram illustrating yet another apparatus according to some embodiments of the present disclosure.

FIG. 7 is a block diagram illustrating an apparatus 700 according to some embodiments of the present disclosure. As shown in FIG. 7, the apparatus 700 may comprise a receiving module 701 and a performing module 702. In an exemplary embodiment, the apparatus 700 may be implemented in a terminal device such as a UE. The receiving module 701 may be operable to carry out the operation in block 302, and the performing module 702 may be operable to carry out the operation in block 304. Optionally, receiving module 701 and/or the performing module 702 may be operable to carry out more or less operations to implement the proposed methods according to the exemplary embodiments of the present disclosure.

Figure 8:
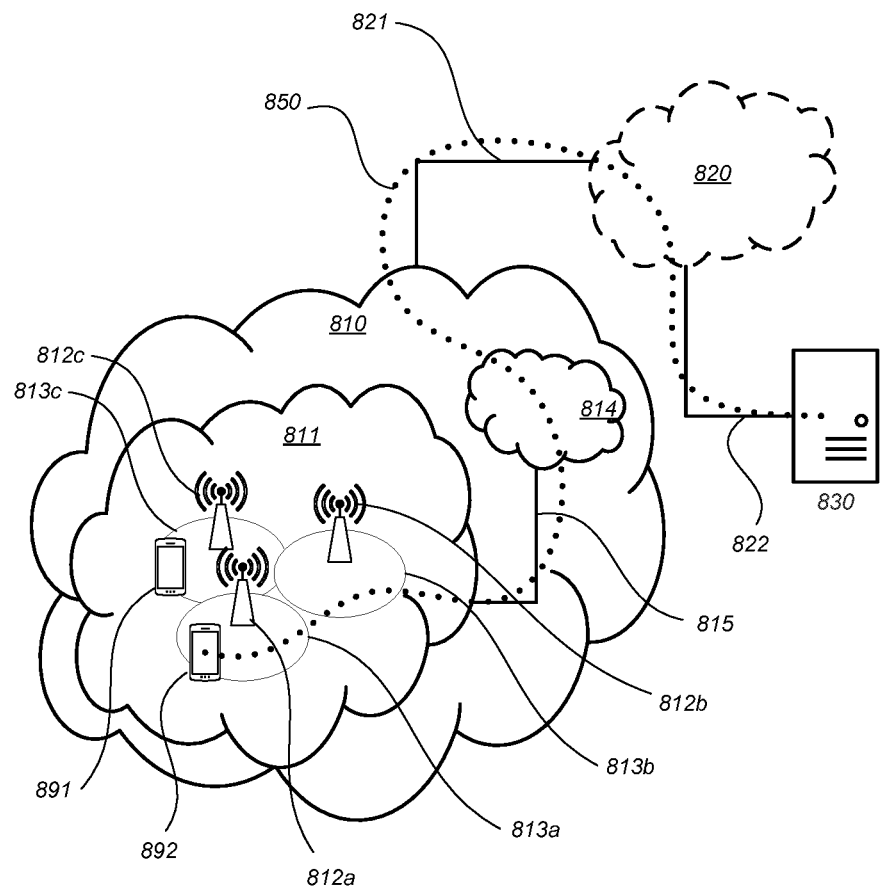
FIG. 8 is a block diagram illustrating a telecommunication network connected via an intermediate network to a host computer in accordance with some embodiments of the present disclosure.

FIG. 8 is a block diagram illustrating a telecommunication network connected via an intermediate network to a host computer in accordance with some embodiments of the present disclosure.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 881 located in a coverage area 813c is configured to wirelessly connect to, or be paged by, the corresponding base station 812c. A second UE 882 in a coverage area 813a is wirelessly connectable to the corresponding base station 812a. While a plurality of UEs 881, 882 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 881, 882 and the host computer 830. The connectivity may be described as an over-the-top (OTT) connection 850. The host computer 830 and the connected UEs 881, 882 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 881. Similarly, the base station 812 need not be aware of the future routing of an outgoing uplink communication originating from the UE 881 towards the host computer 830.

Figure 9:
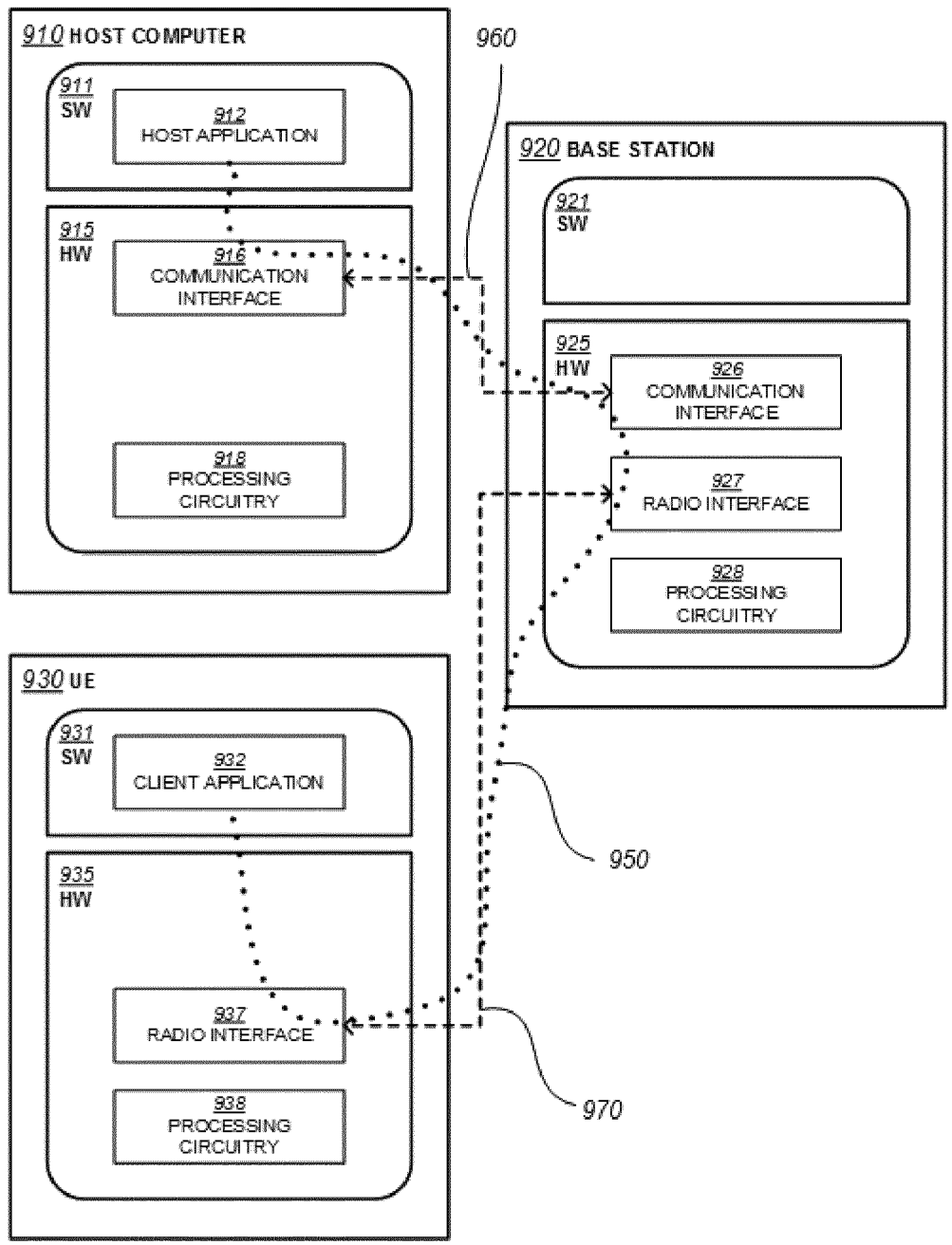
FIG. 9 is a block diagram illustrating a host computer communicating via a base station with a UE over a partially wireless connection in accordance with some embodiments of the present disclosure.

FIG. 9 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 9. In a communication system 900, a host computer 99 comprises hardware 915 including a communication interface 916 configured to set up and maintain a wired or wireless connection with an interface of a different communication device of the communication system 900. The host computer 99 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 99 further comprises software 911, which is stored in or accessible by the host computer 99 and executable by the processing circuitry 918. The software 911 includes a host application 912. The host application 912 may be operable to provide a service to a remote user, such as UE 930 connecting via an OTT connection 950 terminating at the UE 930 and the host computer 99. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 99 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 99. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 99. In the host computer 99, an executing host application 912 may communicate with the executing client application 932 via the OTT connection 950 terminating at the UE 930 and the host computer 99. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 99, the base station 920 and the UE 930 illustrated in FIG. 9 may be similar or identical to the host computer 930, one of base stations 912*a*, 912*b*, 912*c* and one of UEs 991, 992 of FIG. 9, respectively. This is to say, the inner workings of these entities may be as shown in FIG. 9 and independently, the surrounding network topology may be that of FIG. 9.

In FIG. 9, the OTT connection 950 has been drawn abstractly to illustrate the communication between the host computer 99 and the UE 930 via the base station 920, without explicit reference to any intermediary devices and the precise routing of messages via these devices. Network infrastructure may determine the routing, which it may be configured to hide from the UE 930 or from the service provider operating the host computer 99, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 99 and the UE 930, in response to variations in the measurement results. The measurement procedure and/or the network functionality for reconfiguring the OTT connection 950 may be implemented in software 911 and hardware 915 of the host computer 99 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 99's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 10:
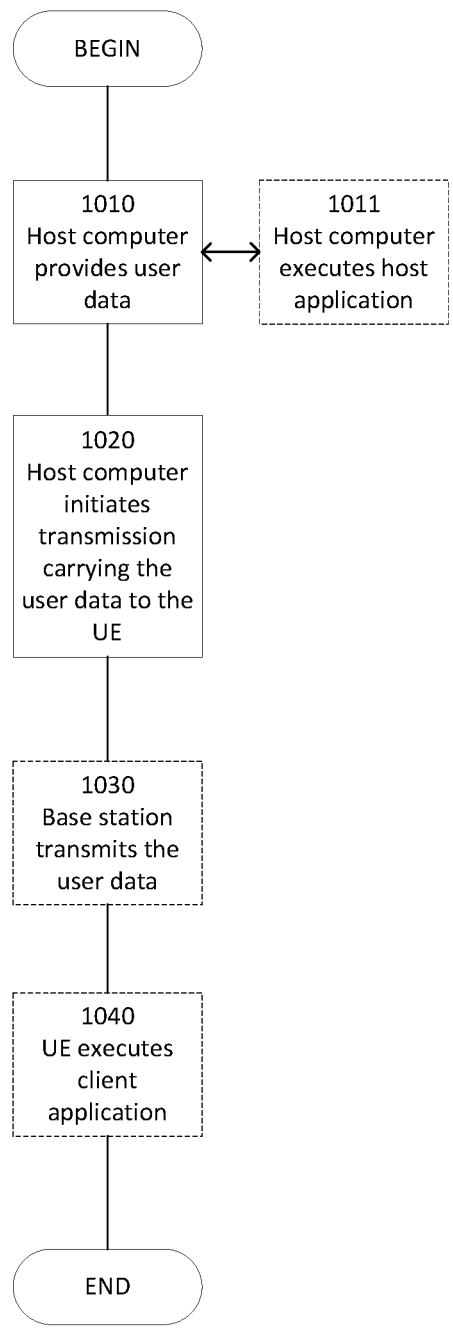
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 10 will be included in this section. In step 1010, the host computer provides user data. In substep 1010 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
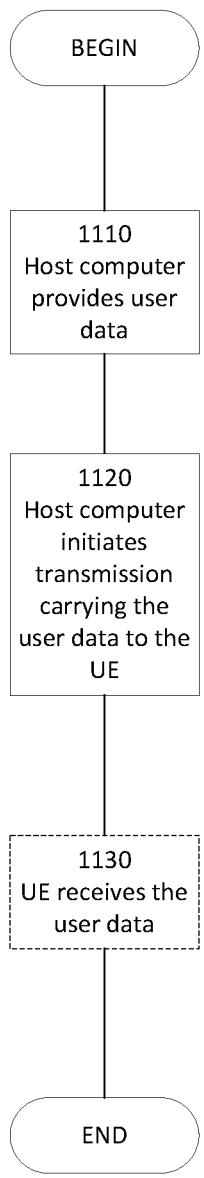
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
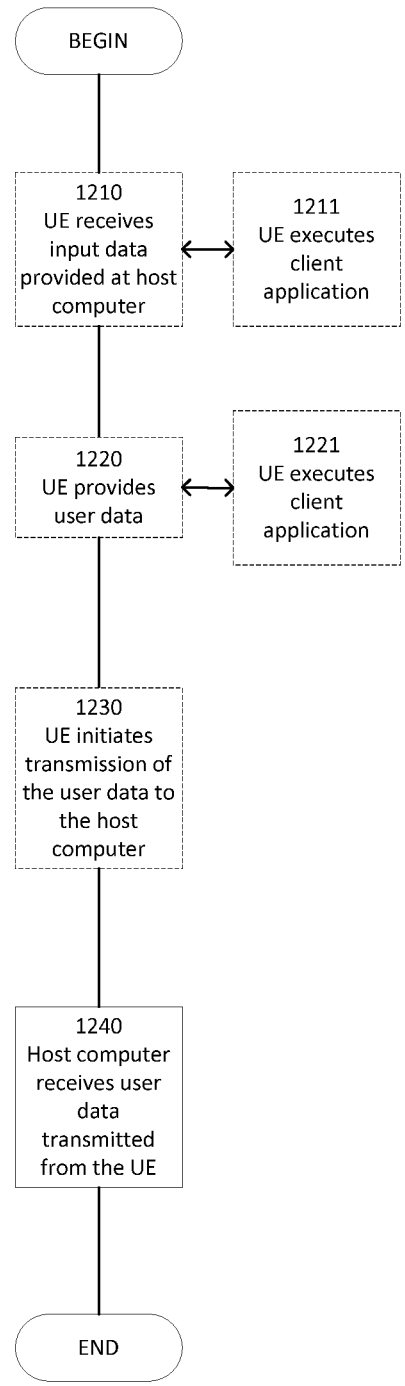
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
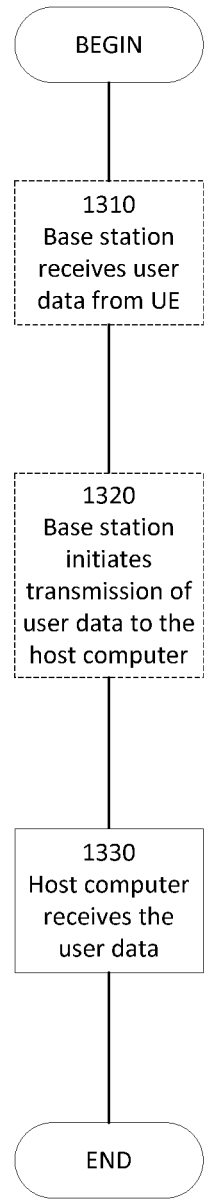
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a network node, the method comprising:
    determining at least one channel measurement configuration for a terminal device, wherein the at least one channel measurement configuration comprises at least one configuration for the terminal device to measure a channel occupancy (CO) of at least one listen before talk (LBT) channel, wherein the at least one LBT channel is a bandwidth segment of a neighboring cell of the terminal device or is a bandwidth segment of a carrier;
    transmitting the at least one channel measurement configuration to the terminal device, wherein the at least one channel measurement configuration is transmitted via Radio Resource Control (RRC) signaling;
    receiving at least one channel measurement report that reports a CO measurement result of the at least one LBT channel; and
    determining whether to trigger a handover or update Radio Resource Management (RRM) configuration for the terminal device based on the received at least one channel measurement report.

2. The method according to claim 1, wherein the at least one channel measurement configuration is associated with a list of LBT channels of a carrier or a cell, the at least one channel measurement configuration comprising multiple measurement objects, each measurement object being associated with an LBT channel.

3. The method according to claim 1, wherein the channel measurement configuration comprises at least one of a channel measurement mode and a full bandwidth measurement mode.

4. The method according to claim 3, further comprising transmitting a signal indicating the terminal device to switch between the channel measurement mode and the full bandwidth measurement mode.

5. The method according to claim 1, wherein the channel measurement report comprises a CO measurement result of one LBT channel, an average CO measurement result of all configured LBT channels of a cell or carrier, and/or respective CO measurement results of all configured LBT channels of a cell or carrier.

6. The method according to claim 1, wherein the handover comprises conditional handover (CHO) and the determining whether to trigger the handover is based on at least one of: Reference Signal Receiving Power (RSRP), Reference Signal Receiving Quality (RSRQ), Signal to Interference plus Noise Ratio (SINR), and the CO measurement result.

7. A method implemented at a terminal device, the method comprising:
    receiving at least one channel measurement configuration from a network node, wherein the at least one channel measurement configuration comprises at least one configuration for the terminal device to measure a channel occupancy (CO) of at least one listen before talk (LBT) channel, wherein the at least one LBT channel is a bandwidth segment of a neighboring cell of the terminal device or is a bandwidth segment of a carrier, wherein the at least one channel measurement configuration is received via Radio Resource Control (RRC) signaling;
    performing CO measurement for the at least one LBT channel according to the at least one channel measurement configuration;
    obtaining at least one CO measurement result from the performed CO measurement;
    transmitting at least one channel measurement report for the at least one CO measurement result; and
    receiving, from the network node, a trigger criterion for a handover or update Radio Resource Management (RRM) configuration determined based on the at least one channel measurement report.

8. The method according to claim 7, further comprising determining whether to trigger the at least one channel measurement report.

9. The method according to claim 7, wherein the at least one channel measurement configuration comprises at least one of: measurement object, reporting configuration, measurement identity, quantity configuration, and measurement gap.

10. The method according to claim 9, wherein the measurement object comprises at least one of: frequency or time location, subcarrier spacing of reference signal to be measured, and single carrier frequency.

11. The method according to claim 10, wherein the frequency or time location comprises channel frequency and/or channel frequency offset.

12. The method according to claim 7, wherein the at least one channel measurement configuration is associated with a list of LBT channels of a carrier or a cell, the at least one channel measurement configuration comprises multiple measurement objects, each measurement object being associated with an LBT channel.

13. The method according to claim 7, wherein the performing comprises:
    performing CO measurement for all configured LBT channels when the terminal device received an LBT channel list; or
    performing CO measurement for LBT channels where a Synchronization Signal Block (SSB) is located.

14. The method according to claim 7, wherein the at least one channel measurement report reports a CO measurement result of one LBT channel, average CO measurement result of all configured LBT channels of a cell or carrier, and/or respective CO measurement results of all configured LBT channels of a cell or carrier.

15. The method according to claim 7, wherein the at least one channel measurement report is transmitted in a periodical way, an event-triggered way, or a configured triggering condition way.

16. The method according to claim 7, wherein the at least one channel measurement configuration comprises at least one of a channel measurement mode and a full bandwidth measurement mode.

17. The method according to claim 16, further comprising receiving a signal indicating the terminal device to switch between the channel measurement mode and the full bandwidth measurement mode.

18. The method according to claim 17, further comprising switching between the channel measurement mode and the full bandwidth measurement mode based on at least one of: a service or traffic type of the terminal device, mobility status of the terminal device, and capability and/or battery life of the terminal device.

19. An apparatus implemented in a terminal device, the apparatus comprising:
    one or more processors; and
    one or more memories comprising computer program codes, the one or more memories and the computer program codes configured to, with the one or more processors, cause the apparatus at least to:
        receive at least one channel measurement configuration from a network node, wherein the at least one channel measurement configuration comprises at least one configuration for the terminal device to measure a channel occupancy (CO) of at least one listen before talk (LBT) channel, wherein the at least one LBT channel is a bandwidth segment of a neighboring cell of the terminal device or is a bandwidth segment of a carrier, wherein the at least one channel measurement configuration is received via Radio Resource Control (RRC) signaling;

perform CO measurement for the at least one LBT channel according to the at least one channel measurement configuration;

obtain at least one CO measurement result from the performed CO measurement;

transmit at least one channel measurement report for the at least one CO measurement result; and receive, from the network node, a trigger criterion for a handover or update Radio Resource Management (RRM) configuration determined based on the at least one channel measurement report.

* * * * *